(12) United States Patent  (10) Patent No.: US 11,495,407 B2
Park et al.  (45) Date of Patent: Nov. 8, 2022

(54) CAPACITOR COMPONENT

(71) Applicant: SAMSUNG ELECTRO-MECHANICS CO., LTD., Suwon-si (KR)

(72) Inventors: Chang Soo Park, Suwon-si (KR); Yong Park, Suwon-si (KR); Ki Pyo Hong, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/186,382

(22) Filed: Feb. 26, 2021

(65) Prior Publication Data

US 2021/0183575 A1 Jun. 17, 2021

Related U.S. Application Data

(63) Continuation of application No. 16/686,690, filed on Nov. 18, 2019, now Pat. No. 10,991,512.

(30) Foreign Application Priority Data

Jul. 5, 2019 (KR) ........................ 10-2019-0081302

(51) Int. Cl.
*H01G 4/232* (2006.01)
*H01G 4/12* (2006.01)
(Continued)

(52) U.S. Cl.
CPC ............. *H01G 4/232* (2013.01); *H01G 4/008* (2013.01); *H01G 4/12* (2013.01); *H01G 4/224* (2013.01); *H01G 4/28* (2013.01)

(58) Field of Classification Search
None
See application file for complete search history.

(56) References Cited

U.S. PATENT DOCUMENTS 9,373,446 B2 6/2016 Park et al.
10,297,388 B2 5/2019 Kato
(Continued)

FOREIGN PATENT DOCUMENTS

CN 108269688 A 7/2018
JP 2016-25301 A 2/2016
(Continued)

OTHER PUBLICATIONS

Office Action issued in corresponding Chinese Patent Application No. 202010084273.4 dated Aug. 4, 2021, with English translation.

*Primary Examiner* — Dion R. Ferguson
(74) *Attorney, Agent, or Firm* — Morgan, Lewis & Bockius LLP

(57) ABSTRACT

A capacitor component includes a lamination portion in which first and second internal electrodes are disposed to face each other in a first direction and separated from each other by a dielectric layer, and a body comprising the lamination portion and first and second connection portions disposed on both sides of the lamination portion in a second direction, perpendicular to the first direction, and connected to the first and second internal electrodes. The first and second connection portions each include a metal layer including nickel and disposed on the lamination portion and a ceramic layer disposed on the metal layer, and an average thickness of each of the first and second internal electrodes is 0.4 μm or less.

15 Claims, 10 Drawing Sheets

(51) Int. Cl.
　　*H01G 4/224*　　　(2006.01)
　　*H01G 4/28*　　　　(2006.01)
　　*H01G 4/008*　　　(2006.01)

(56) References Cited

U.S. PATENT DOCUMENTS

| | | | |
|---|---|---|---|
| 10,629,379 | B2 | 4/2020 | Cho et al. |
| 11,250,992 | B2 * | 2/2022 | Park ................... H01G 4/2325 |
| 11,302,476 | B2 * | 4/2022 | Park ...................... H01G 4/224 |
| 2007/0205514 | A1 | 9/2007 | Togashi |
| 2012/0307417 | A1 | 12/2012 | Kim et al. |
| 2012/0319536 | A1 | 12/2012 | Sakuratani |
| 2015/0021073 | A1 | 1/2015 | Kim |
| 2016/0027584 | A1 | 1/2016 | Hattori |
| 2017/0278634 | A1 | 9/2017 | Kato |
| 2017/0278635 | A1 | 9/2017 | Mizuno et al. |
| 2018/0096791 | A1 | 4/2018 | Nishisaka et al. |
| 2018/0158608 | A1 | 6/2018 | Fujita et al. |
| 2018/0190433 | A1 | 7/2018 | Cho et al. |
| 2019/0066923 | A1 | 2/2019 | Jung et al. |
| 2019/0355518 | A1 | 11/2019 | Harada |
| 2019/0385795 | A1 | 12/2019 | Yang et al. |
| 2020/0176186 | A1 | 6/2020 | Moon et al. |
| 2021/0183575 | A1 * | 6/2021 | Park ........................ H01G 4/28 |

FOREIGN PATENT DOCUMENTS

| | | | |
|---|---|---|---|
| JP | 2018-93051 | A | 6/2018 |
| KR | 10-2015-0011263 | A | 1/2015 |
| KR | 10-2018-0079807 | A | 7/2018 |

* cited by examiner

CAPACITOR COMPONENT

CROSS-REFERENCE TO RELATED APPLICATION(S)

This application is the continuation application of U.S. patent application Ser. No. 16/686,690 filed on Nov. 18, 2019, which claims benefit of priority to Korean Patent Application No. 10-2019-0081302 filed on Jul. 5, 2019 in the Korean Intellectual Property Office, the disclosures of which are incorporated herein by reference in their entirety.

TECHNICAL FIELD

The present disclosure relates to a capacitor component.

BACKGROUND

A multilayer ceramic capacitor (MLCC), among capacitor components, has advantages of a small size, high capacity and ease of mounting thereof.

A method of dipping a surface, on which an internal electrode of a body is exposed, in a paste, where the paste includes a conductive metal, has conventionally been used when forming an external electrode of the MLCC.

However, the external electrode formed by the dipping method results in uneven thickness thereof, and the external electrode formed at an edge portion of the body may be excessively thin. Further, when forming a deposition layer on the external electrode, deposition liquid penetrates into the body, thereby reducing reliability of the MLCC.

SUMMARY

An aspect of the present disclosure is to provide a capacitor component having improved moisture resistance reliability.

Another aspect is to provide a capacitor component having improved capacity per unit volume.

Another aspect is to provide a capacitor component having improved productivity.

According to an aspect of the present disclosure, a capacitor component includes a lamination portion in which first and second internal electrodes are disposed to face each other in a first direction and separated from each other by a dielectric layer; and a body comprising the lamination portion and first and second connection portions disposed on both sides of the lamination portion in a second direction, perpendicular to the first direction, and connected to the first and second internal electrodes. The first and second connection portions each include a metal layer including nickel and disposed on the lamination portion and a ceramic layer disposed on the metal layer, and an average thickness of each of the first and second internal electrodes is 0.4 µm or less.

According to an aspect of the present disclosure, a capacitor component includes a lamination portion in which first and second internal electrodes are disposed to face each other in a first direction and separated from each other by a dielectric layer; a body comprising the lamination portion and first and second connection portions disposed on both sides of the lamination portion in a second direction and connected to the first and second internal electrodes, respectively; and first and second external electrodes disposed on the first and second connection portions, respectively. The first and second connection portions each comprise a metal layer comprising nickel and disposed on the lamination portion and a ceramic layer disposed on the metal layer. A length, in the first direction, of the ceramic layer is less than a length, in the first direction, of the lamination portion.

BRIEF DESCRIPTION OF DRAWINGS

The above and other aspects, features, and advantages of the present disclosure will be more clearly understood from the following detailed description, taken in conjunction with the accompanying drawings, in which:

FIG. 5A is a cross-sectional view of a first internal electrode and FIG. 5B is a cross-sectional view of a second internal electrode;

DETAILED DESCRIPTION

Figure 1:
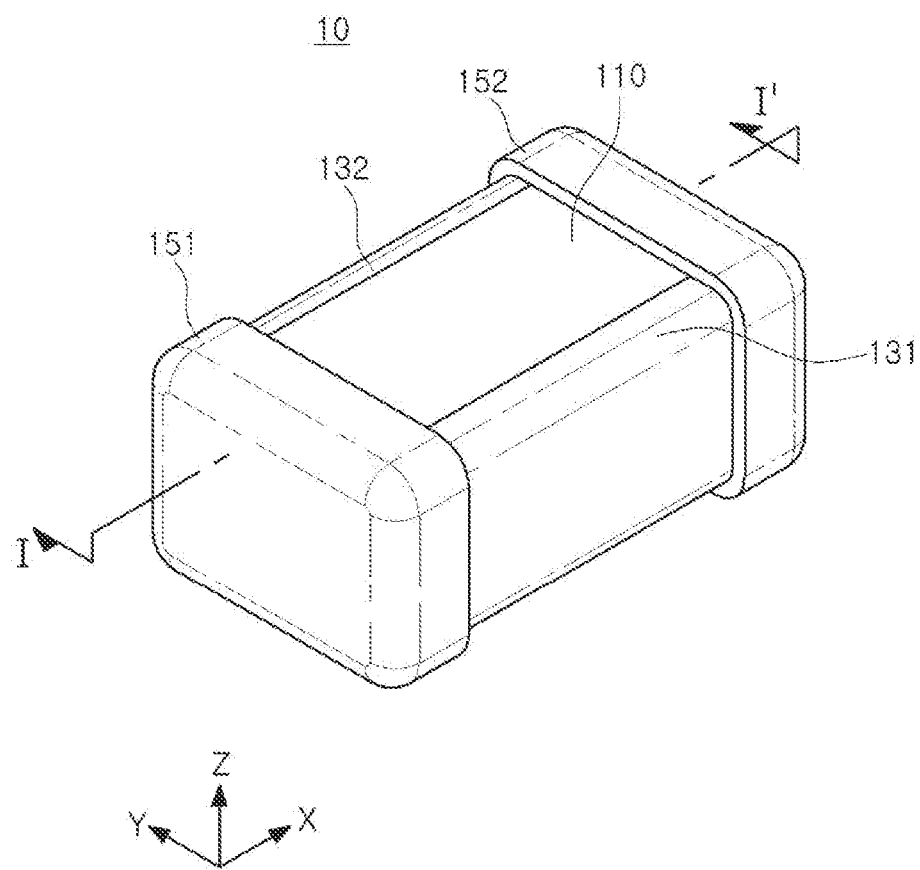
FIG. 1 is a schematic perspective view of a capacitor component according to an exemplary embodiment of the present disclosure.

Hereinafter, embodiments of the present disclosure will be described as follows with reference to the attached drawings. The invention may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements.

In the drawings, anything unnecessary for describing the present disclosure will be omitted for clarity, and thicknesses are enlarged for the purpose of clearly illustrating layers and areas. The same reference numerals will be used throughout to designate the same or like elements. In the specification, unless otherwise specifically indicated, when a certain part "includes" a certain component, it is understood that other components may be further included but are not excluded.

In the drawings, an X direction may refer to a second direction, an L direction or a length direction, and a Y direction may refer to a third direction, a W direction or a width direction, and a Z direction may refer to a first direction, a T direction or a thickness direction.

Hereinbelow, a capacitor component according to an exemplary embodiment of the present disclosure will be described in detail in reference to FIGS. 1 to 5B.

Figure 2:
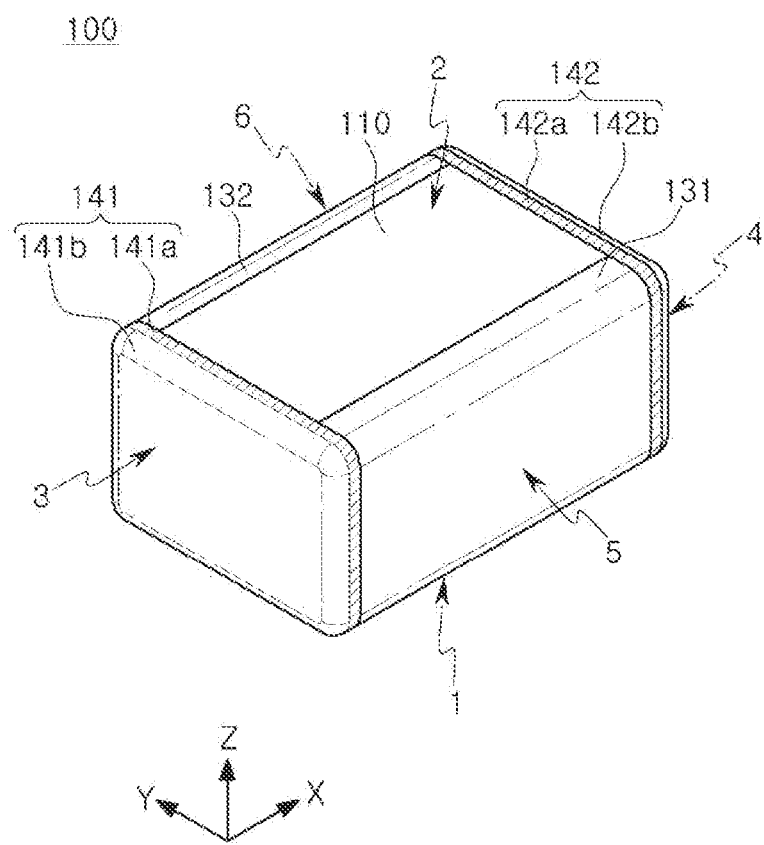
FIG. 2 is a schematic perspective view of a body of FIG. 1.
Figure 3:
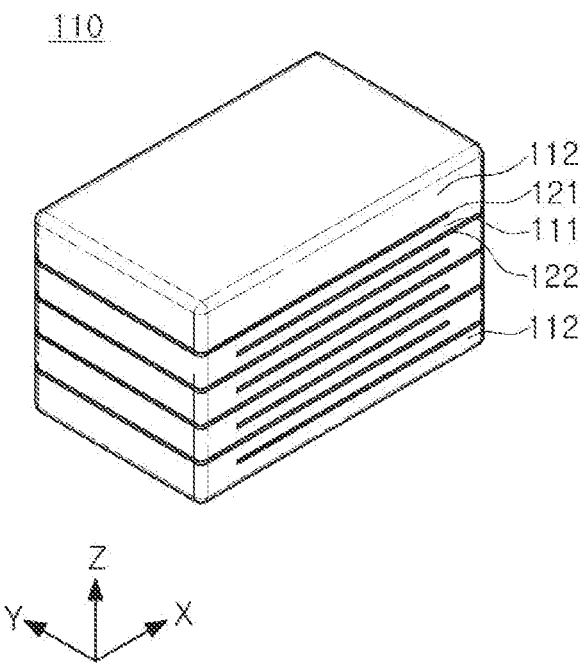
FIG. 3 is a perspective view of a lamination portion of FIG. 1.
Figure 4:
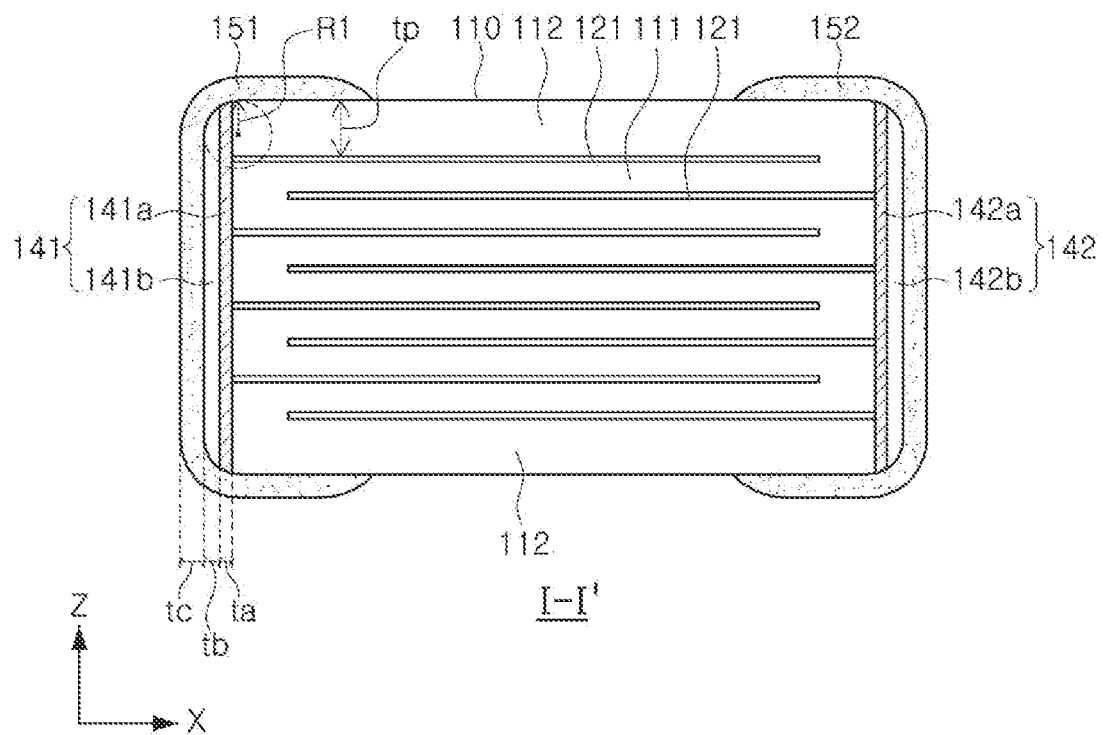
FIG. 4 is a cross-sectional view taken along line I-I' in FIG. 1.
Figure 5A:
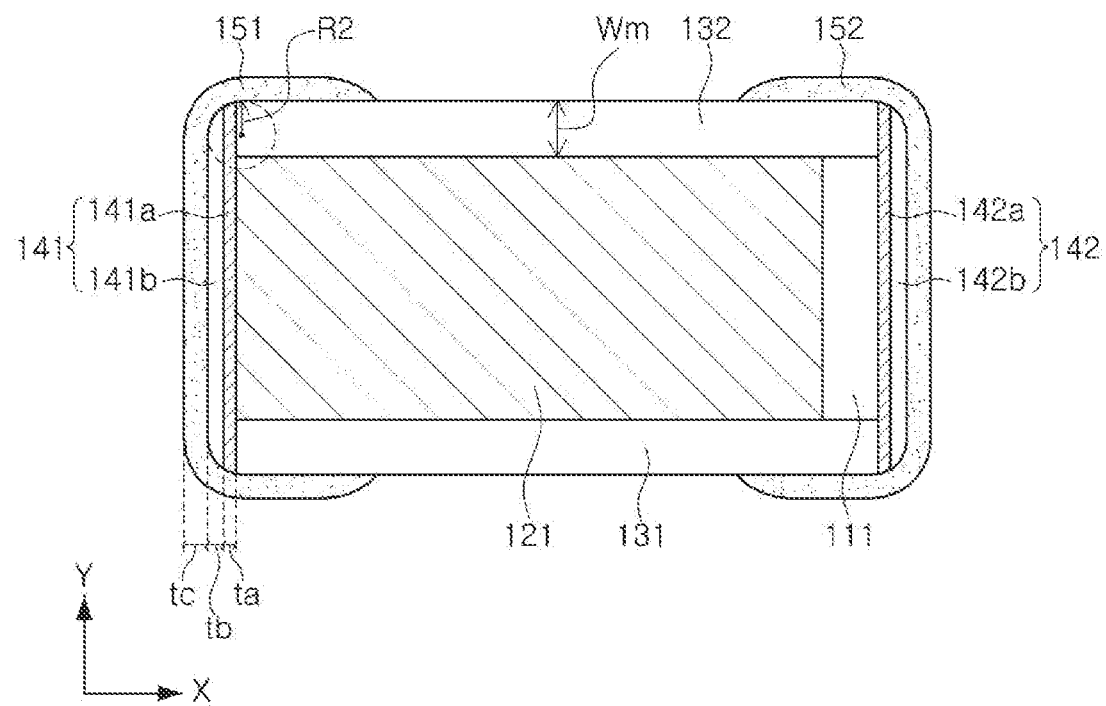
FIGS. 5A and 5B are cross-sectional views of FIG. 1 in X and Y directions, where
Figure 5B:
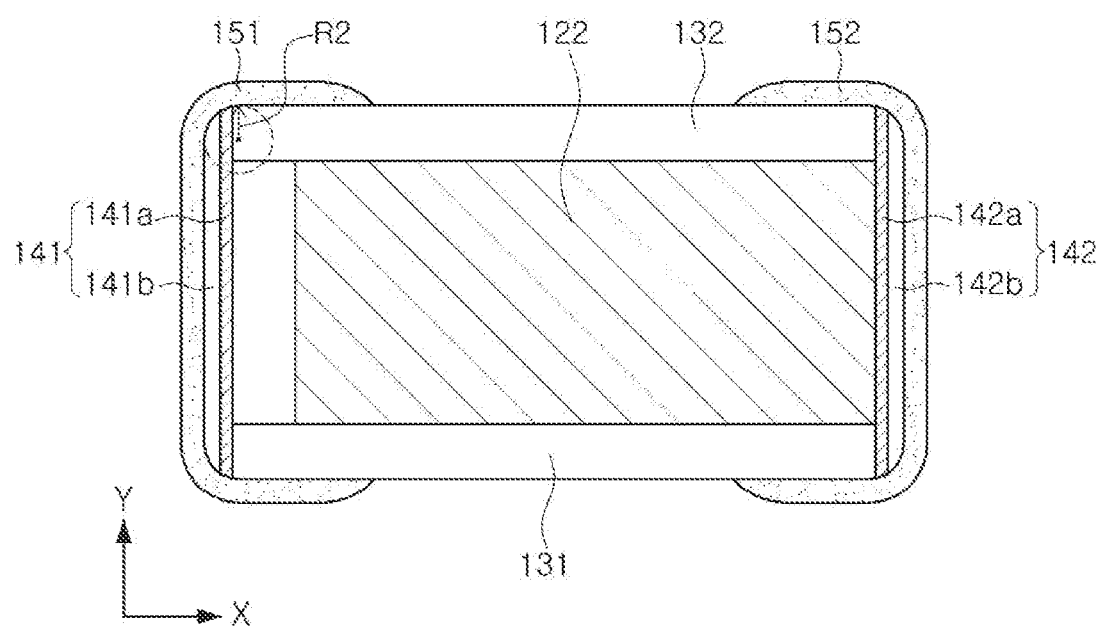

FIG. 1 is a schematic perspective view of a capacitor component according to an exemplary embodiment of the present disclosure. FIG. 2 is a schematic perspective view of a body of FIG. 1. FIG. 3 is a perspective view of a lamination portion of FIG. 1. FIG. 4 is a cross-sectional view taken along line I-I' in FIG. 1. FIGS. 5A and 5B are cross-sectional views of FIG. 1 in X and Y directions, where FIG. 5A is a cross-sectional view of a first internal electrode and FIG. 5B is a cross-sectional view of a second internal electrode.

A capacitor component 10 of the present disclosure includes a dielectric layer 111, a lamination portion 110 in which first and second internal electrodes 121 and 122 disposed to face each other in a first direction (Z direction), and a body 100 comprising first and second connection portions 141 and 142 disposed on both sides of the lamination portion 110 in a second direction (X direction) perpendicular to the first direction (Z direction) and electrically connected to the first and second internal electrodes 121 and 122. The first and second connection portions 141 and 142 are disposed on the lamination portion 110 and include metal layers 141a and 142a comprising nickel and disposed on the lamination portion 110 and ceramic layers 141b and 142b disposed on the metal layers 141a and 142a, respectively. An average thickness of each of the first and second internal electrodes 121 and 122 is 0.4 μm or less.

In an exemplary embodiment, the body 100 may include a lamination portion 110, and first and second connection portions 141 and 142.

Although not particularly limited, a specific configuration of the body 100 may be hexahedral or a similar shape as illustrated in the drawings. Due to oxidation of ceramic powder included in the body during plasticization, the body 100 may not be hexahedral, having perfectly straight lines, but may have a substantially hexahedral configuration. The body 100 may include a first surface 1 and a second surface 2 opposing each other in a thickness direction (Z direction), a third surface 3 and a fourth surface 4 connected to the first and second surfaces and opposing each other in a length direction (X direction), and a fifth surface 5 and a sixth surface 6 connected to the first and second surfaces 1 and 2 and to the third and fourth surfaces 3 and 4 and opposing each other in a width direction (Y direction).

In an example, the dielectric layer 111 and the internal electrodes 121 and 122 may be alternately laminated in the lamination portion 110 in the first direction. A plurality of the dielectric layers 111 forming the lamination portion 110 are plasticized, and may be integrated in a single body such that boundaries between neighboring dielectric layers 111 may not be readily apparent without using a Scanning Electric Microscope (SEM).

According to an exemplary embodiment, a material forming the dielectric layers 111 is not particularly limited, as long as sufficient capacitance may be obtained therewith. For example, the material may be barium titanate-base, lead complex perovskite-base or strontium titanate-base material, or the like.

Further, as for the material forming the dielectric layer 111, various ceramic additives, organic solvents, plasticizers, binders, dispersants, or the like, may be added to barium titanate ($BaTiO_3$) powder, or the like, according to purposes of the present disclosure.

The lamination portion may be formed by alternately laminating in the thickness direction (Z direction) a ceramic green sheet on which the first internal electrode 121 is printed and a green sheet on which the second internal electrode 122 is printed.

In an example of the present disclosure, a plurality of the internal electrodes 121 and 122 may be disposed to face each other with respective dielectric layers 111 interposed therebetween. The internal electrodes 121 and 122 may include the first and second internal electrodes 121 and 122 alternately disposed to face each other with respective dielectric layers 111 interposed therebetween.

The first internal electrode 121 may be exposed to one surface of the lamination portion 110 in the second direction (X direction), and the portion exposed to the one surface in the second direction (X direction) may be connected to a metal layer 141a of a fist connection portion 141. The second internal electrode 122 may be exposed to the other surface of the lamination portion 110 in the second direction (X direction), and the portion exposed to the one surface in the second direction (X direction) may be connected to a metal layer 142a of a second connection portion 142. The first and second internal electrodes 121 and 122 may be electrically separated from each other by the dielectric layers 111 interposed therebetween.

A material forming the first and second internal electrodes 121 and 122 is not particularly limited, and may be, for example, a conductive paste containing at least one of silver (Ag), palladium (Pd), gold (Au), platinum (Pt), nickel (Ni), copper (Cu), tin (Sn), tungsten (W), titanium (Ti) and alloys thereof. A method for printing the conductive paste may be a screen-printing method, a gravure printing method, or the like, but is not limited thereto.

An average thickness of each of the first and second internal electrodes 121 and 122 may be 0.4 μm or less. The average thickness of each of the internal electrodes may be an average of values measured at 5 different positions in a plasticized internal electrode. A lowest limit of the average thickness of each of the first and second internal electrodes is not particularly limited, but may be at least 0.01 μm.

In an exemplary embodiment, first and second connection portions 141 and 142 may include metals layers 141a and 142a disposed on the lamination portion 110 and ceramic layers 141b and 142b disposed on the metal layers 141a and 142a, respectively.

The metal layers 141a and 142a are disposed on one surface and the other surface, respectively, of the lamination portion 110 in the second direction (X direction) so as to be electrically connected to the first and second internal electrodes 121 and 122.

The metal layers 141a and 142a may include a metal having high electrical conductivity, and may include a metal the same as that of the first and second internal electrodes 121 and 122 to enhance electrical connectivity to the first and second internal electrodes 121 and 122. For example, the metal layers 141a and 142a may include at least one of silver (Ag), palladium (Pd), gold (Au), platinum (Pt), nickel (Ni), copper (Cu), tin (Sn), tungsten (W), titanium (Ti) and alloys thereof.

The metal layers 141a and 142a may be provided in the form of a sintered electrode, and may be sintered simultaneously with a body 100. In this case, the metal layers 141a and 142, before sintering, may be transferred to the body in a state containing an organic material such as a binder and a metal particle. After the sintering, the organic material, or the like, may be removed.

A thickness (ta) of each of the metal layers 141a and 142a may be, for example, in the range of 1 μm to 10 μm. As used herein, a thickness (ta) of a metal layer may refer to a length of the metal layer in the second direction (X direction). The thickness of the metal layer may be at least 1.0 μm, at least 1.5 μm or at least 2.0 μm, and may be 10.0 μm or less, 9.5 μm or less, 9.0 μm or less, 8.5 μm or less, 8.0 μm or less, 7.5 μm or less or 7.0 μm or less, but is not limited thereto. By satisfying said thickness ranges, the metal layers can secure connectivity to the internal electrodes as well as electrical conductivity with external electrodes, which will be described below.

The ceramic layers 141b and 142b are disposed on the metal layers 141a and 142, respectively, and minimize penetration of moisture, a plating solution, or the like, from outside by improving sealing characteristics. The ceramic layers 141b and 142b may be formed not to cover cross sections (e.g., end surfaces) of the metal layers 141a and 142b in the first and third directions (Z and Y directions).

The ceramic layers 141b and 142b may be formed of ceramic materials such as barium titanate, or the like. In this case, the ceramic layers 141b and 142b may contain the same ceramic materials contained in the dielectric layers 111 or may be formed of the same materials as the dielectric layers 111.

The ceramic layers 141b and 142b may be formed by the same transfer process as the metal layers 141a and 142, followed by sintering. It is preferable that the ceramic layers 141b and 142b have high adhesion for the transfer process before sintering, and thus may include relatively a large amount of organic materials such as a binder, or the like. In this case, as there may be some organic materials remaining even after the sintering, the ceramic layers 141b and 142b may contain a larger amount of the organic materials than the dielectric layers 111.

A thickness (tb) of each of the ceramic layers 141b and 142b may be, for example, in the range of 3 μm to 15 μm. As used herein, a thickness (tb) of a ceramic layer may refer to a length of the ceramic layer in the second direction (X direction). The thickness of the ceramic layer may be at least 3.0 μm, at least 3.5 μm, at least 4.0 μm, at least 4.5 μm or at least 5.0 μm, and may be 15.0 μm or less, 14.5 μm or less, 14.0 μm or less, 13.5 μm or less, 13.0 μm or less, 12.5 μm or less, 12.0 μm or less, 11.5 μm or less, 11.0 μm or less, 10.5 μm or less or 10.0 μm or less, but is not limited thereto. When the thickness of the ceramic layers satisfies said ranges, water resistance moisture can be secured and mechanical strength of the capacitor component can be increased.

In an exemplary embodiment, the first and second connection portions 141 and 142 may be formed by a sheet transfer method. The sheet transfer method is not particularly limited, but may involve transferring the ceramic layers in sheet form and the metal layers in sheet form on the body to have a uniform thickness. Accordingly, a ratio of a minimum thickness to a maximum thickness of the first and second connection portions 141 and 142 is 0.9 to 1.0. The thickness of the first and second connection portions 141 and 142 may refer to a length of the first and second portions 141 and 142 in the second direction (X direction).

According to another exemplary embodiment, an edge of the body 100 may have a rounded shape in the first and second directional cross section. Due to such rounded shape, external electrodes 151 and 152 may be formed to be thin and have a uniform thickness.

When the edge of the body is angular, chipping, damage to edges due to collisions between chips, may occur during manufacturing of an MLCC, which may cause an appearance defect and reduced moisture resistance reliability. To solve this, there have been attempts to grind the body edge to be rounded and to prevent the formation of thin external electrodes as well as to suppress chipping.

However, the grinding of the body edge may cause problems such as exposure of internal electrodes, or the like, thereby making it difficult to obtain a sufficiently rounded portion on the edge. Further, in the case of thick protective layers for the prevention of internal electrode exposure, capacity per unit volume of the capacitor component is reduced.

According to an exemplary embodiment, a sufficiently rounded portion can be formed on the edge of the body 100 by disposing the first and second connection portions 141 and 142 on both surfaces of the lamination portion 110 in the second direction (X direction) respectively. This will prevent the formation of thin external electrode on the edge without reducing capacity per unit volume and chipping.

In an exemplary embodiment, the lamination portion 110, a capacitance forming portion in which capacitance is formed by comprising the first and second internal electrodes 121 and 122 disposed to face each other with respective dielectric layers 111 interposed therebetween, and protective portions 112 formed on upper and lower portions of the capacitance forming portion, respectively.

The upper and lower protective portions 112 may have the same composition as the dielectric layers 111 and may be formed by laminating at least one dielectric layer, which does not include internal electrodes, on each of an upper portion of an uppermost internal electrode and a lower portion of a lowermost internal electrode of the body 100, respectively.

The upper and lower protective portions 112 may basically prevent damage to the internal electrodes caused by physical or chemical stress.

A thickness (tp) of each of the upper and lower protective portions 112 may be, for example, 25 μm or less. The thickness (tp) of each of the upper and lower protective portions 112 may be 25 μm or less, 24 μm or less, 23 μm or less, 22 μm or less, 21 μm or less or 20 μm or less. According to an exemplary embodiment, a sufficiently rounded portion can be formed by disposing the connection portions 141 and 142 on the lamination portion 110. In this regard, capacitance per unit volume of the capacitor component 10 can be enhanced by minimizing the thickness (tp) of the upper and lower protective portions.

For example, according to an exemplary embodiment, the capacitance can be enhanced per unit volume as a sufficiently rounded portion is formed and the internal electrodes can be protected even when tp is 20 μm or less. As such, when tp is 20 μm or less, the effect according to the present disclosure can be more remarkable.

In addition, a lowest limit of the tp is not limited, and can be appropriately determined considering a radius (R1) of curvature of the edge of the body in a first and second directional cross section, and may be, for example, 5 μm or more.

As used herein, the thickness (tp) of each of the upper and lower protective portions 112 may be may refer to a length of the upper and lower protective portions 112 in the first direction (Z direction).

Referring to FIG. 4, R1/tp may be greater than or equal to 0.3 and less than or equal to 1.4, where the tp is a thickness of each of the upper and lower protective portions and the R1 is a radius of curvature of the edge of the body in a first and second directional cross section (Z-X cross section or L-T cross section).

When the R1/tp is less than 0.3, a sufficiently rounded portion cannot be formed, thereby causing chipping or slimming of external electrodes on the edge.

On the other hand, the R1/tp greater than 1.4 may generate a short due to exposure of the internal electrodes or may make it difficult to form external electrodes. As used herein, a short due to an exposure of internal electrodes refers to a case in which the first internal electrode 121 is exposed to a surface on which the second external electrode 152 is formed and becomes connected to the second external electrode 152 or in which the second internal electrode 122 is exposed to a surface on which the first external electrode 151 is formed and becomes connected to the first external electrode 151 by grinding the edge of the body.

The R1/tp may be greater than 1.0 and less than or equal to 1.4.

When R1/tp is controlled to be greater than 1.0 in the absence of the connection portions 141 and 142, a short is highly likely to occur due to the exposure of the internal electrodes. When the connection portions 141 and 142 are provided according to the present disclosure, a possibility for the short due to the exposure of the internal electrodes to occur is significantly reduced even when the R1/tp is controlled to be greater than 1.0 and less than or equal to 1.4.

The rounded portion of the edge of the body 100 in the first and second directional cross section may be formed on the connection portions 141 and 142, and as illustrated in FIGS. 4, 5A, and 5B, may extend to a portion of the lamination portion 110. A length, in the first direction, of the ceramic layer 141b may be less than a length, in the first direction, of the lamination portion 110. A length, in the first direction, of the ceramic layer 142b may be less than the length, in the first direction, of the lamination portion 110. A length, in the third direction, of the ceramic layer 141b may be less than a length, in the third direction, of the lamination portion 110. A length, in the third direction, of the ceramic layer 142b may be less than a length, in the third direction, of the lamination portion 110. A length, in the first direction, of an interface between the metal layer 141a and the ceramic layer 141b may be less than a length, in the first direction, of an interface between the metal layer 141a and the lamination portion 110. A length, in the first direction, of an interface between the metal layer 142a and the ceramic layer 142b may be less than a length, in the first direction, of an interface between the metal layer 142a and the lamination portion 110. A length, in the third direction, of the interface between the metal layer 141a and the ceramic layer 141b may be less than a length, in the third direction, of the interface between the metal layer 141a and the lamination portion 110. A length, in the third direction, of the interface between the metal layer 142a and the ceramic layer 142b may be less than a length, in the third direction, of the interface between the metal layer 142a and the lamination portion 110.

In an exemplary embodiment, the first and second margin portions 131 and 132 may be disposed on both surfaces (fifth and sixth surfaces), respectively, in a third direction (Y direction) perpendicular to the first and second directions of the lamination portion.

Conventionally, a surface of the dielectric layer was formed to be larger than that of an internal electrode in order to form margin portions on remaining circumferential portion of the internal electrodes, which excludes portions connected to external electrodes. In this case, however, when dozens to hundreds of dielectric layers are laminated, the dielectric layers elongate to fill a step portion, and the internal electrodes bend. When the internal electrodes bend, breakdown voltage (BDV) may be reduced at the bent portion.

Accordingly, the step can be prevented from occurring due to the internal electrodes by removing the margin portions on both surfaces of the lamination portion 110 of the capacitor component according to an exemplary embodiment in the third direction. By preventing the internal electrodes from bending, the BDV can be prevented from being reduced, thereby improving the reliability of the capacitor component.

The internal electrodes can be protected by disposing the first and second margin portions 131 and 132 on both surfaces of the lamination portion 110 in the third direction. As the first and second margin portions 131 and 132 are separately formed, there is no need to consider manufacturing errors such as misalignment of the internal electrodes, or the like. Accordingly, a thickness (Wm) of each of the first and second margin portions 131 and 132 can be adjusted to be thinner than that of conventional margin portions, and thus, capacity of the capacitor component can be enhanced per unit volume.

When the body 100 includes the first and second margin portions 131 and 132, the first internal electrode 121 may be exposed to both surfaces of the lamination portion 110 in the third direction and one surface of the lamination portion 110 in the second direction. The portion exposed to the one surface in the second direction may be connected to the first connection portion 141. Meanwhile, the second internal electrode 122 may be exposed to both surfaces of the lamination portion 110 in the third direction and the other surface of the lamination portion 110 in the second direction. The portion exposed to the other surface in the second direction may be connected to the second connection portion 142.

The first and second margin portions 131 and 132 may be formed of an insulating material, and may be formed of a ceramic material such as $BaTiO_3$, or the like. In this case, the first and second margin portions 131 and 132 may contain the same ceramic materials contained in the dielectric layers 111 or may be formed of the same materials as the dielectric layers 111.

The first and second margin portions 131 and 132 are not particularly limited in terms of a formation method thereof, and may be, for example, formed by applying a slurry containing a ceramic or laminating a dielectric sheet on both surfaces of the lamination portion in the third direction.

The first and second margin portions 131 and 132 may also be formed by transferring a dielectric sheet using the previously described transfer method. In this regard, the first and second margin portions 131 and 132 may have a uniform thickness. A ratio of a minimum Wm to a maximum Wm may be 0.9 to 1.0 when the Wm refers to a thickness of each of the first and second margin portions 131 and 132.

In the case of forming the first and second margin portions 131 and 132 by transferring a dielectric sheet, it is preferable that the first and second margin portions 131 and 132 formed before the sintering have high adhesion for the transferring process. To this end, the first and second margin portions 131 and 132 may contain a relatively large amount of organic materials such as a binder. In this case, as there may be some organic materials remaining even after the sintering, the ceramic layers 141b and 142b may contain a larger amount of the organic materials than the dielectric layers 111.

The thickness (Wm) of the first and second margin portions 131 and 132 is not particularly limited; however, as a sufficiently rounded portion can be formed on an edge of the body by disposing the connection portions 141 and 142 on the lamination portion 110, Wm can be minimized to enhance the capacity of the capacitor component per unit volume. For example, according to the present disclosure, a sufficiently rounded portion can be formed even when the Wm is 15 μm or less, while protecting the internal electrodes 121 and 122, thereby enhancing the capacity per unit volume.

In addition, a lower limit of the Wm is not particularly limited, and can be appropriately determined considering a radius (R2) of curvature of the edge of the body in a second and third directional cross section (X-Y cross section, L-W cross section). The lower limit of the Wm may be, for example, 5 μm or more. As used herein, the thickness (Wm) of each of the first and second margin portions may refer to a length of each of the first and second margin portions 131 and 132 in the third direction (Y direction).

Referring to FIGS. 5A and 5B, R2/Wm may be greater than or equal to 0.3 and less than or equal to 1.4, where the Wm is a thickness of each of the first and second margin portions and the R2 is a radius of curvature of the edge of the body in a second and third directional cross section (X-Y cross section, L-W cross section). When the R2/Wm is less than 0.3, a sufficiently rounded portion cannot be formed, thereby causing chipping or slimming of external electrodes on the edge. In contrast, the R2/Wm greater than 1.4 may generate a short due to an exposure of the internal electrodes or make it difficult to form external electrodes. As used herein, a short due to an exposure of internal electrodes refers to a case in which the first internal electrode 121 is exposed to a surface on which the second external electrode 152 is formed and becomes connected to the second external electrode 152 or in which the second internal electrode 122 is exposed to a surface on which the first external electrode 151 is formed and becomes connected to the first external electrode 151 by grinding the edge of the body.

The R2/Wm may be greater than 1.0 and less than or equal to 1.4.

When R2/Wm is controlled to be greater than 1.0 in the absence of the connection portions 141 and 142, a short is highly likely to occur due to the exposure of the internal electrodes. When the connection portions 141 and 142 are provided according to the present disclosure, however, a possibility for the short due to the exposure of the internal electrodes to occur is significantly reduced even when the R2/Wm is controlled to be greater than 1.0 and less than or equal to 1.4.

Meanwhile, for facilitation of the grinding process, the radius R2 of curvature of the edge of the body in the second and third directional cross section may be the same as the radius R1 of curvature of the edge of the body in the first and second directional cross section, but is not particularly limited thereto. The edge of the body may be ground to make the R2 different from the R1.

As the first and second margin portions 131 and 132 are formed on the lamination portion 110 followed by forming the first and second connection portions 141 and 142 using the transfer method, the first connection portion 141 may be disposed to cover one surface of the first and second margin portions 131 and 132 in the second direction (X direction), and the second connection portion 142 may be disposed to cover the other surface of the first and second margin portions 131 and 132 in the second direction (X direction).

In addition, the first connection portion 141 may be disposed not to deviate from one surfaces of the lamination portion 110 and the first and second margin portions 131 and 132 in the second direction (X direction), and the second connection portion 142 may be disposed not to deviate from the other surfaces of the lamination portion 110 and the first and second margin portions 131 and 132 in the second direction (X direction). That is, the first connection portion may not extend toward both surfaces of the lamination portion 110 in the first direction (Z direction) and both surfaces of the first and second margin portions 131 and 132 in the third direction (Y direction).

The first and second external electrodes 151 and 152 may be disposed on the first and second connection portions 141 and 142, respectively. The first external electrode 151 may be electrically connected to the first internal electrode 121 through the metal layer 141a of the first connection portion 141, and the second external electrode 152 may be electrically connected to the second internal electrode 122 through the metal layer 142a of the second connection portion 142.

The first external electrode 151 extends toward both surfaces of the first connection portion 141 in the first direction (Z direction). Since the metal layer 141a of the first connection portion 141 is exposed in the first direction (Z direction), the first external electrode 151 can be electrically connected to the metal layer 141a of the first connection portion 141. The second external electrode 152 extends toward both surfaces of the second connection portion 142 in the first direction (Z direction). Since the metal layer 142a of the second connection portion 142 is exposed in the first direction (Z direction), the second external electrode 152 can be electrically connected to the metal layer 142a of the second connection portion 142. The first and second external electrodes 151 and 152 may respectively extend toward both surfaces of the first and second connection portions 141 and 142 in the third direction (Y direction) as well. The metal layers 141a and 142a of the first and second connection portions are exposed from the ceramic layers 141b and 142b, respectively, in the third direction (Y direction), and thus can be connected to the first and second external electrodes 151 and 152, respectively.

Additionally, the first and second external electrodes 151 and 152 may extend onto a portion of the first and second surfaces 1 and 2. The first and second external electrodes 151 and 152 may extend even onto a portion of the fifth and sixth surfaces 5 and 6 of the body.

Figure 10:
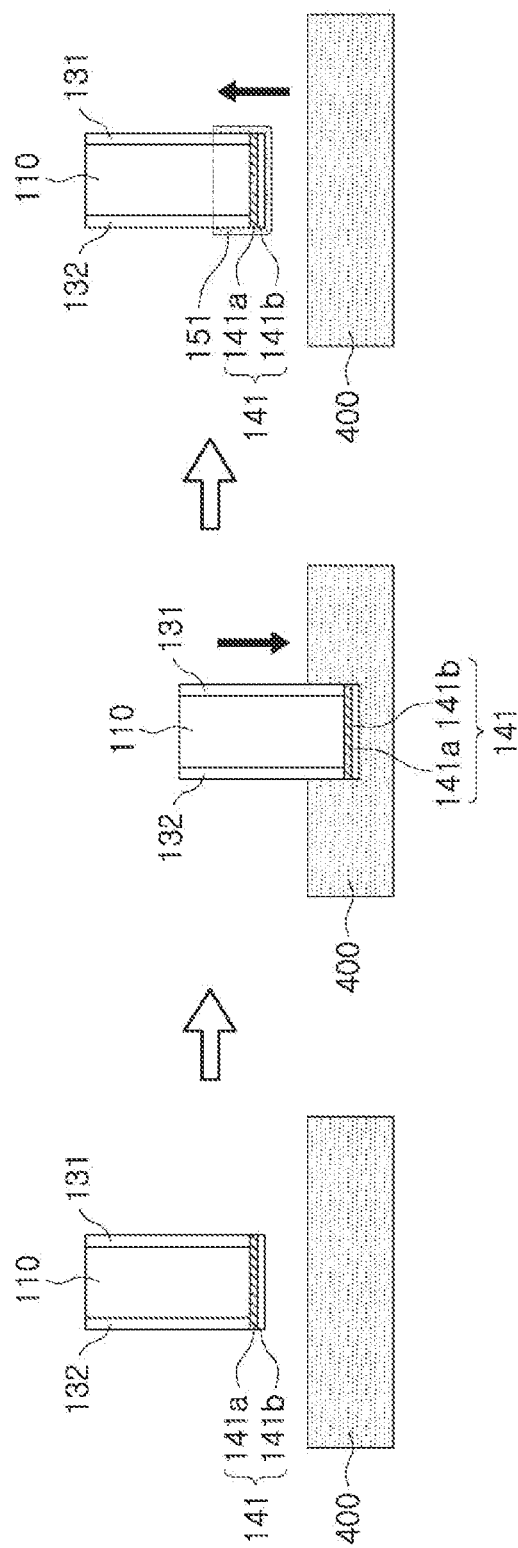
FIG. 10 is a diagram illustrating a process of forming external electrodes on a connection portion of a capacitor component according to an exemplary embodiment.
Figure 11:
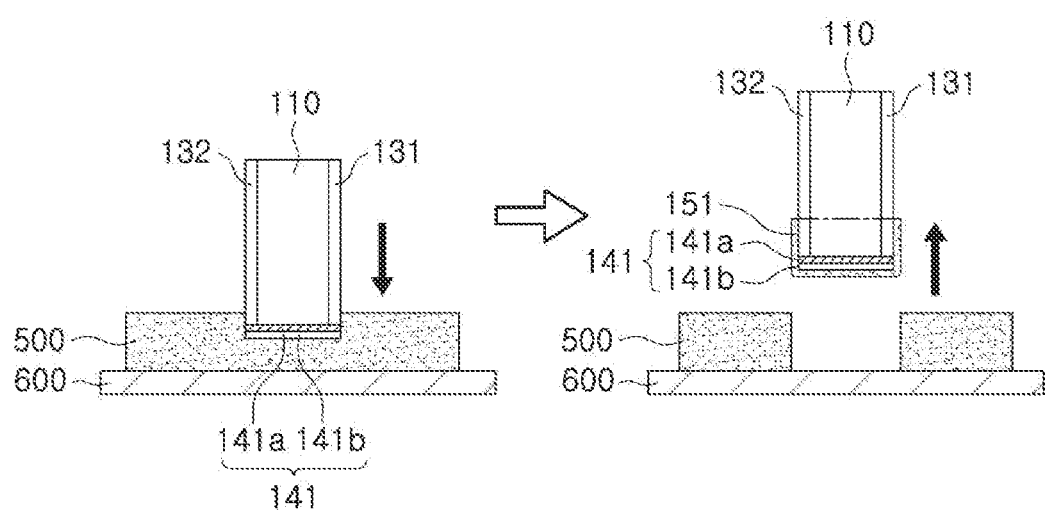
FIG. 11 is a diagram illustrating a process of forming external electrodes on a connection portion of a capacitor component according to an exemplary embodiment.

A method for forming the first and second external electrodes 151 and 152 should not be particularly limited, and for example, may be formed by dipping the body in a paste containing a conductive metal and glass (FIG. 10) or transferring a dry film obtained by drying the metal paste on the first and second connection portions (FIG. 11).

According to an exemplary embodiment, as an edge of the body 100 has a rounded shape, slimming of the thickness of the external electrodes 151 and 152 on the edge of the body can be suppressed even when the external electrodes are formed using a dipping process.

Further, in the case of the transferring process using the previously described dry film, the external electrodes can be formed to have a uniform thickness.

Accordingly, a minimum tc to a maximum tc may be 0.8 to 1.0 when tc refers to a thickness of each of the first and second external electrodes 151 and 152.

In an example, the thickness of the first and second external electrodes 151 and 152 may be in the range of 5 μm to 25 μm. For example, the thickness of the first and second external electrodes 151 and 152 may be at least 5 μm, 6 μm, 7 μm, 8 μm, 9 μm or 10 μm, and 25 μm or less, 24 μm or less, 23 μm or less, 22 μm or less, 21 μm or less or 20 μm or less, but is not limited thereto. As the thickness of the first and second external electrodes satisfies said ranges, excellent mountability and electrical conductivity can be retained while enabling slimming and miniaturization of the capacitor component.

In an exemplary embodiment according to the present disclosure, the first and second external electrodes may use at least one of silver (Ag), palladium (Pd), gold (Au), platinum (Pt), nickel (Ni), copper (Cu), tin (Sn), tungsten (W), titanium (Ti) and alloys thereof. In particular, when Ni is contained, connectivity of the first and second external electrodes to the metal layers of the first and second connection portions may be improved, and excellent electrical conductivity can be exhibited.

Meanwhile, in order to improve mountability on the substrate, a plated layer may be formed on the first and second external electrodes 151 and 152. As a more specific example, the plated layer may be a Ni-plated layer or a Sn-plated layer, or in the form in which the Ni-plated layer and the Sn-plated layer are formed on the external electrodes in order, or may include multiple Ni-plated layers and/or multiple Sn-plated layers.

Figure 6:
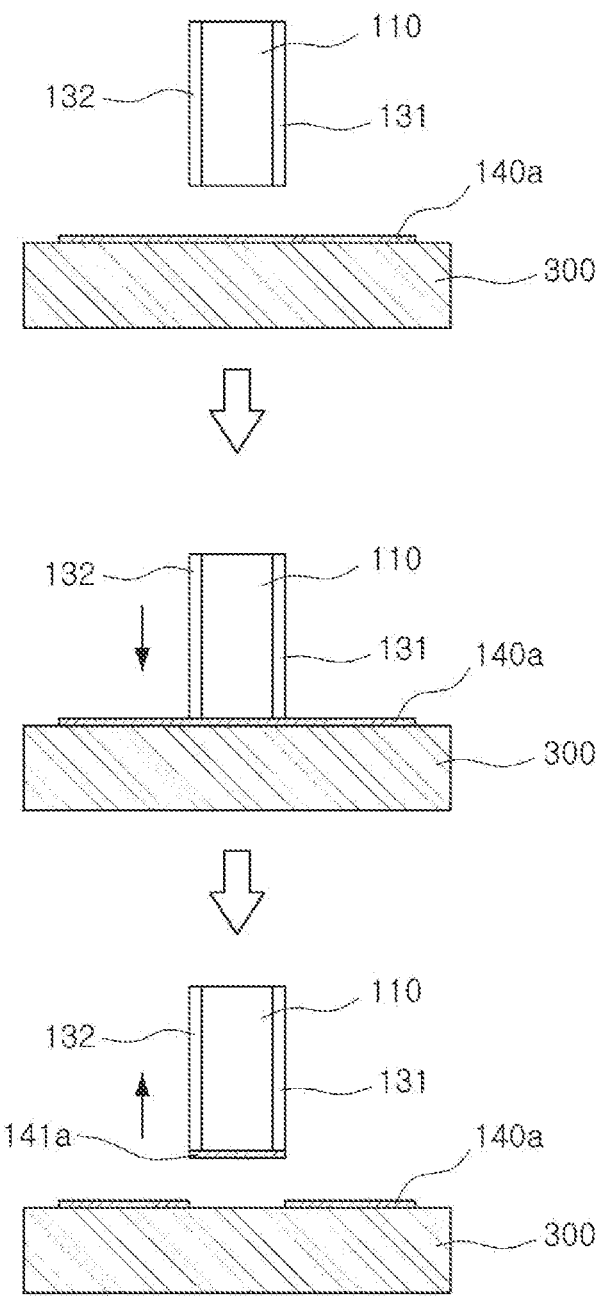
FIGS. 6 to 9 are diagrams illustrating a process of forming a connection portion of a capacitor component according to an exemplary embodiment by a transfer method.
Figure 7:
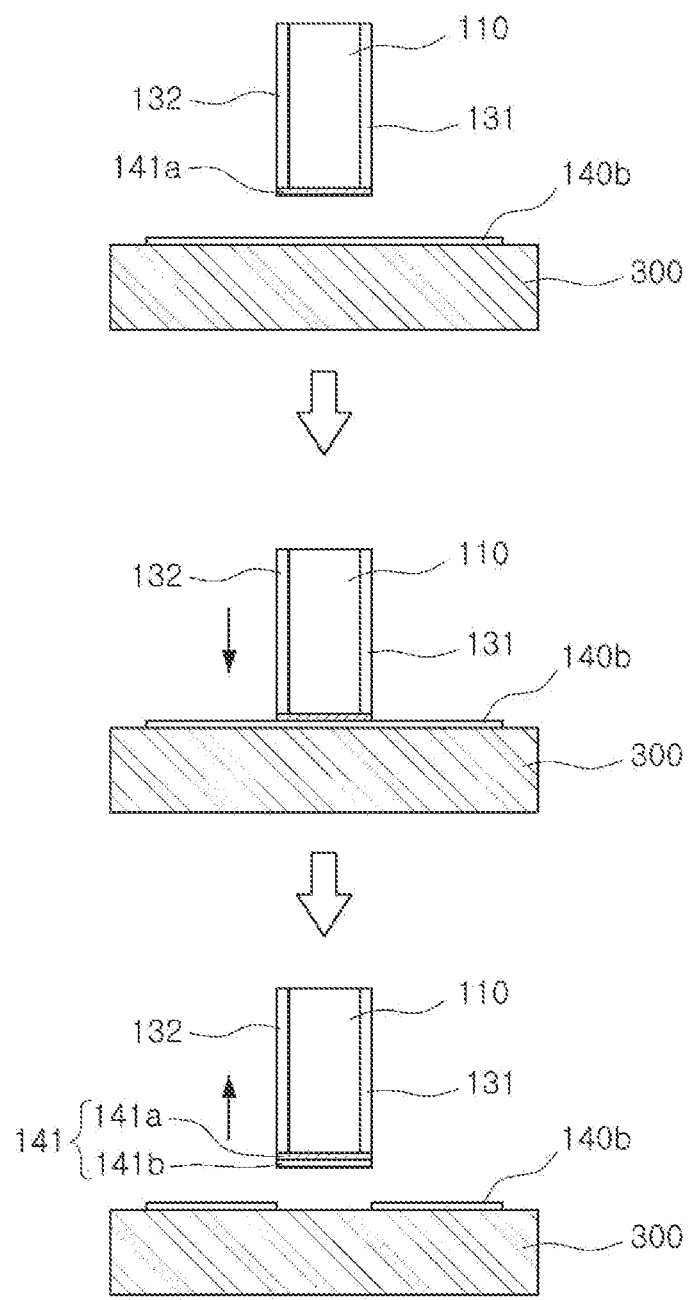
Figure 8:
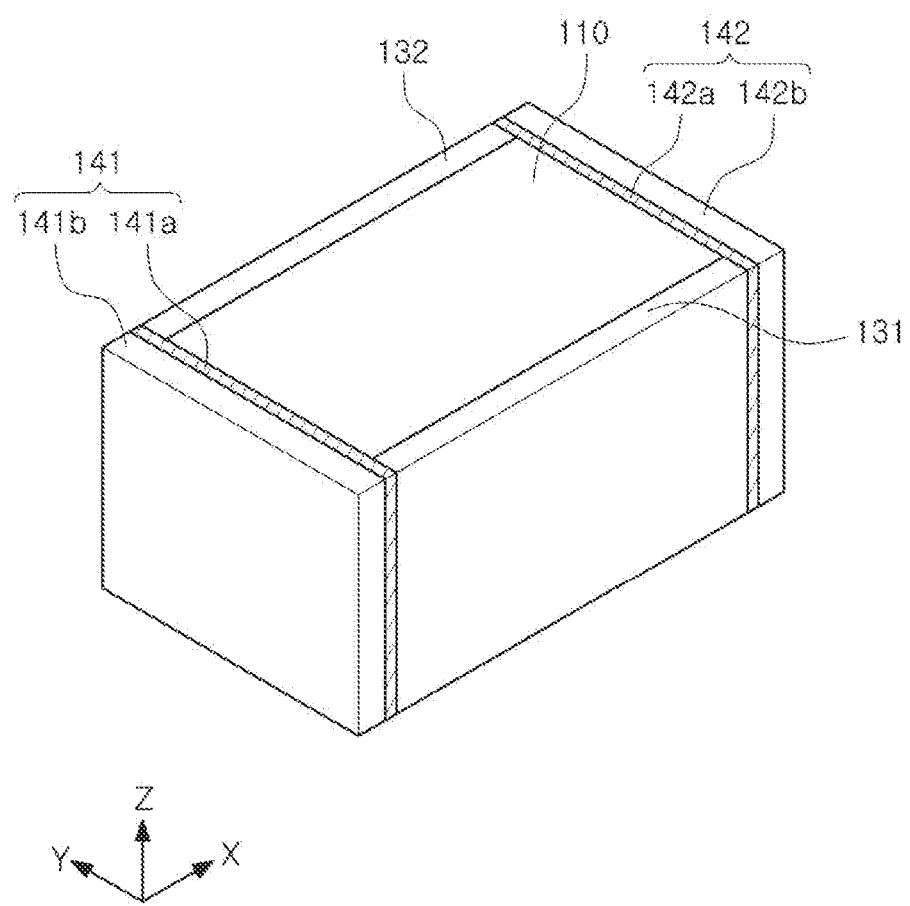
Figure 9:
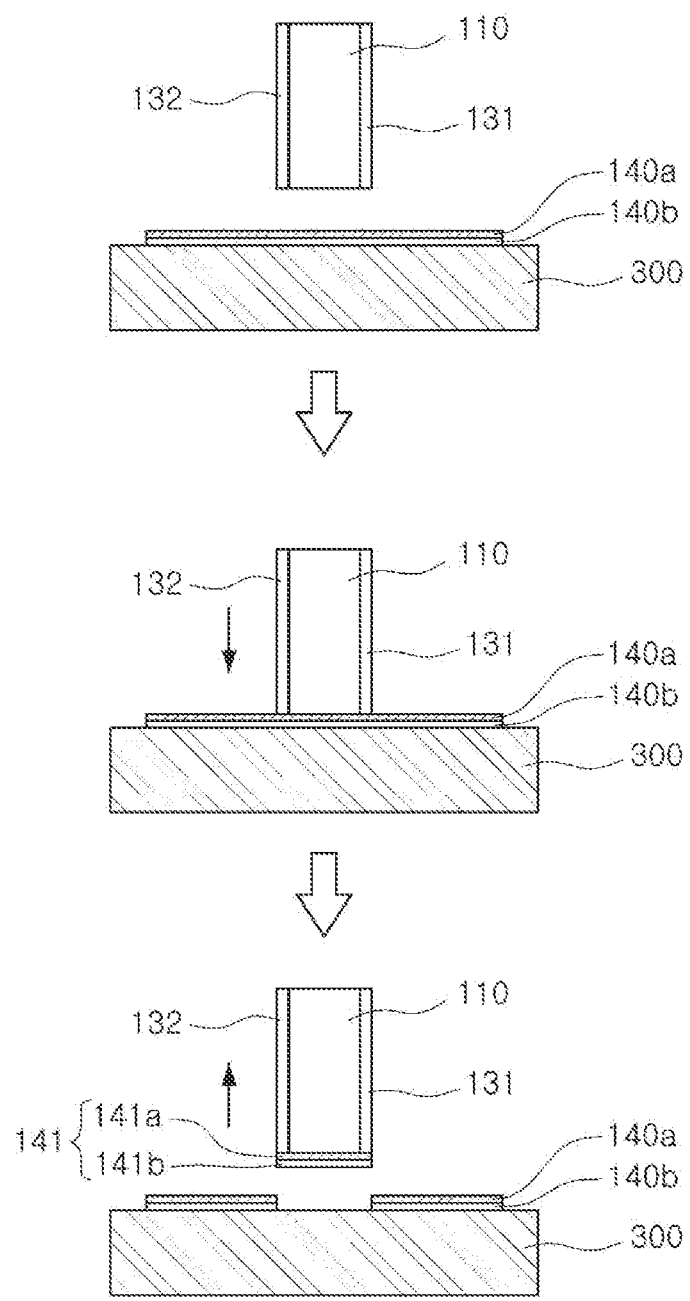

FIGS. 6 to 8 are diagrams illustrating a process of forming a connection portion 141 of a capacitor component according to an exemplary embodiment by a transfer method.

As illustrated in FIG. 6, the transferring of the metal layer 141a involves preparing a metal layer sheet 140a on a supporter 300, followed by compressing the lamination portion 110 thereon to allow the metal layer 141a to adhere to a surface of the lamination portion 110. The metal layer sheet 140a is in a pre-sintered state and contains metal particles, a binder, an organic solvent, and other ingredients.

As illustrated in FIG. 7, a ceramic layer sheet 140b is prepared on the supporter 300, and the lamination portion 110 is compressed thereon, thereby allowing the ceramic layer 141b to adhere to a surface of the metal layer 141a. The ceramic layer sheet 140b is in a pre-sintered state and contains ceramic particles, a binder, an organic solvent, and other ingredients.

A body as in FIG. 8 may be prepared by forming a metal layer 142a and a ceramic layer 142b on a surface opposing to the surface on which the metal layer 141a and the ceramic layer 141b are formed through the same process.

An edge of the body is ground to be round, and the ground body 100 is dipped in a conductive paste to form external electrodes 151 and 152, thereby manufacturing a capacitor component 10.

Meanwhile, the first connection portion 141 may be formed without individually transferring the metal layer and the ceramic layer but by preparing the supporter 300 on which the ceramic layer sheet 140b and the metal layer sheet 140a are laminated and transferring in a single step.

According to an exemplary embodiment, capacity per unit volume can be increased by disposing the connection portions on the lamination portion, thereby improving moisture resistance reliability.

According to another exemplary embodiment, a sufficiently rounded portion may be formed at the edge of the body. When the round portion is formed at the edge of the body, the thickness of the external electrodes may be uniform and may be thin.

According to an exemplary embodiment, when the margin portions are disposed on both side surfaces of the lamination portion, capacity per unit volume may be further increased.

According to another exemplary embodiment, a capacitor component having improved productivity can be provided by disposing the external electrodes on the connection portions.

Meanwhile, various and beneficial advantages and effects of the present disclosure are not limited to the above description, and are more readily understood in the specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A capacitor component, comprising:
a lamination portion in which first and second internal electrodes are disposed to face each other in a first direction and separated from each other by a dielectric layer; and
a body comprising the lamination portion and first and second connection portions disposed on both sides of the lamination portion in a second direction, perpendicular to the first direction, and connected to the first and second internal electrodes, respectively,
wherein the first and second connection portions each comprise a metal layer comprising nickel and disposed on the lamination portion and a ceramic layer disposed on the metal layer, and
wherein the first connection portion and the body have a rounded shape at a region where an end portion of the first connection portion is connected to the body.

2. The capacitor component of claim 1, wherein a thickness of the metal layer is in a range of 1 μm to 10 μm.

3. The capacitor component of claim 1, wherein a thickness of the ceramic layer is in a range of 3 μm to 15 μm.

4. The capacitor component of claim 1, wherein each of the first and second connection portion is formed by transferring the ceramic layer in a sheet form and the metal layer in a sheet form in the second direction.

5. The capacitor component of claim 1, wherein a ratio of a minimum thickness to a maximum thickness of each of the first and second connection portions is 0.9 to 1.0.

6. The capacitor component of claim 1, wherein the lamination portion comprises:
a capacitance forming portion comprising the first and second internal electrodes with the dielectric layer therebetween, and
upper and lower protective portions respectively disposed on upper and lower portions of the capacitance forming portion.

7. The capacitor component of claim 6, wherein R1/tp is greater than or equal to 0.3 and less than or equal to 1.4, where tp is a thickness of each of the upper and lower protective portions and R1 is a radius of curvature of the edge of the body in a first and second directional cross section.

8. The capacitor component of claim 6, wherein a thickness of each of the upper and lower protective portions is 25 μm or less.

9. The capacitor component of claim 1, wherein the capacitor component comprises first and second margin portions disposed on surfaces of the lamination portion in a third direction, respectively.

10. The capacitor component of claim 9, wherein R2/Wm is greater than or equal to 0.3 and less than or equal to 1.4, where Wm is a thickness of each of the first and second margin portions and R2 is a radius of curvature of the edge of the body in a second and third directional cross section.

11. The capacitor component of claim 1, further comprising first and second external electrodes disposed on the first and second connection portions, respectively.

12. The capacitor component of claim 11, wherein a thickness of each of the first and second external electrodes is in a range of 5 μm to 25 μm.

13. The capacitor component of claim 11, wherein the first and second external electrodes comprise nickel.

14. The capacitor component of claim 11, wherein a ratio of a minimum thickness to a maximum thickness of each of the first and second external electrodes is 0.8 to 1.0.

15. The capacitor component of claim 1, wherein an average thickness of one of the first and second internal electrodes is 0.4 µm or less and 0.01 µm or more.

* * * * *